(12) United States Patent
Quinn et al.

(10) Patent No.: US 8,147,728 B2
(45) Date of Patent: Apr. 3, 2012

(54) PAD TRANSFER PRINTING OF SILICONE HYDROGEL LENSES USING COLORED INK

(75) Inventors: Michael Hugh Quinn, Valparaiso, IN (US); Gregory Carlson, Park Ridge, IL (US); Barry L. Atkins, Chicago, IL (US)

(73) Assignee: Novartis AG, Basel (CH)

( * ) Notice: Subject to any disclaimer, the term of this patent is extended or adjusted under 35 U.S.C. 154(b) by 984 days.

(21) Appl. No.: 11/093,819

(22) Filed: Mar. 30, 2005

(65) Prior Publication Data

US 2005/0218536 A1    Oct. 6, 2005

Related U.S. Application Data

(60) Provisional application No. 60/558,461, filed on Apr. 1, 2004.

(51) Int. Cl.
*B29D 11/00* (2006.01)
(52) U.S. Cl. .......................................... 264/1.7; 264/2.5
(58) Field of Classification Search ............... 264/1.7, 264/1.1, 1.32, 2.5; 425/808
See application file for complete search history.

(56) References Cited

U.S. PATENT DOCUMENTS

| | | | |
|---|---|---|---|
| 3,536,386 A | 10/1970 | Spivak | 351/160 |
| 3,679,504 A | 7/1972 | Wichterle | 156/62 |
| 3,712,718 A | 1/1973 | LeGrand et al. | 351/160 |
| 4,252,421 A | 2/1981 | Foley, Jr. | 351/162 |
| 4,405,773 A | 9/1983 | Loshack et al. | 526/317 |
| 4,460,523 A | 7/1984 | Neefe | 264/1.9 |
| 4,468,229 A | 8/1984 | Su | |
| 4,582,402 A | 4/1986 | Knapp | 351/162 |
| 4,634,449 A | 1/1987 | Jenkins | 8/507 |
| 4,639,105 A | 1/1987 | Neefe | 351/162 |
| 4,668,240 A | 5/1987 | Loshack | 8/507 |
| 4,702,574 A | 10/1987 | Bawa | 351/162 |
| 4,704,017 A | 11/1987 | Knapp | 351/177 |
| 4,719,657 A | 1/1988 | Bawa | 8/453 |
| 4,744,647 A | 5/1988 | Meshel et al. | 351/177 |
| 4,857,072 A | 8/1989 | Narducy et al. | 8/507 |
| 4,954,132 A | 9/1990 | Hung et al. | 8/507 |
| 4,963,159 A | 10/1990 | Nrducy et al. | 8/507 |
| 5,034,166 A | 7/1991 | Rawlings et al. | 264/1.7 |
| 5,116,112 A | 5/1992 | Rawlings et al. | 351/162 |
| 5,120,121 A | 6/1992 | Rawlings et al. | 351/162 |
| 5,121,121 A * | 6/1992 | Grudkowski et al. | 341/172 |
| 5,256,739 A | 10/1993 | Ono | |
| 5,260,000 A | 11/1993 | Nandu et al. | 264/2.1 |
| 5,272,010 A * | 12/1993 | Quinn | 428/411.1 |
| 5,414,477 A | 5/1995 | Jahnke | 351/162 |
| 5,452,658 A | 9/1995 | Shell | 101/401.1 |
| 5,637,265 A | 6/1997 | Misciagno et al. | 264/1.7 |
| 5,793,466 A | 8/1998 | Moncada | 351/162 |
| 5,936,705 A | 8/1999 | Ocampo et al. | 351/162 |
| 6,030,078 A | 2/2000 | Ocampo et al. | 351/162 |
| 6,132,043 A | 10/2000 | Atkins et al. | 351/162 |
| 6,164,777 A | 12/2000 | Li et al. | 351/162 |
| 6,248,266 B1 | 6/2001 | Gartley et al. | 264/1.36 |
| 6,284,161 B1 | 9/2001 | Thakrar et al. | 264/1.7 |
| 6,315,410 B1 | 11/2001 | Doshi | 351/162 |
| 6,337,040 B1 | 1/2002 | Thakrar et al. | 264/1.7 |
| 6,359,024 B2 | 3/2002 | Lai | 522/64 |
| 6,465,538 B2 | 10/2002 | Lai | 522/64 |
| 6,503,313 B2 | 1/2003 | Matakawa | |
| 6,523,953 B2 | 2/2003 | Jahnke | 351/162 |
| 2001/0002416 A1 | 5/2001 | Matakawa | |
| 2001/0050753 A1 | 12/2001 | Tucker | 351/177 |
| 2002/0027638 A1 | 3/2002 | Thakrar et al. | 351/162 |
| 2002/0039172 A1 | 4/2002 | Ocampo et al. | 351/162 |
| 2003/0054109 A1 | 3/2003 | Quinn et al. | 427/385.5 |
| 2003/0119943 A1 | 6/2003 | Tucker et al. | 523/160 |
| 2003/0165015 A1 | 9/2003 | Jahnke | 359/581 |
| 2004/0001181 A1 * | 1/2004 | Kunzler et al. | 351/162 |
| 2004/0044099 A1 | 3/2004 | Tucker et al. | 523/160 |

FOREIGN PATENT DOCUMENTS

| | | |
|---|---|---|
| EP | 1 235 096 | 8/2002 |
| EP | 1 262 307 A2 | 12/2002 |
| EP | 1262307 A2 * | 12/2002 |
| FR | 1499774 | 11/1966 |
| WO | WO 97/41180 | 11/1997 |

OTHER PUBLICATIONS

Euopean Standard Search Report.
International Search Report.
European Search Report dated Apr. 7, 2010, Application No. EP10155212.3.

\* cited by examiner

*Primary Examiner* — Mathieu D. Vargot
(74) *Attorney, Agent, or Firm* — Sheng-Hsin Hu; Jian Zhou

(57) ABSTRACT

The present invention provides a method for making colored silicone hydrogel contact lenses. The method of the invention comprises the steps of: (a) applying a color coat to at least a portion of at least one of molding surfaces of a lens mold with an ink, wherein the ink comprises at least one colorant, a binder polymer, an adhesion promoter, and optionally a diluent, wherein the binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromer, and (iv) optionally one or more components selected from the group consisting of a polymerization initiator, a chain transfer agent, and a solvent, wherein the mold has a lens-forming cavity between the molding surfaces, wherein the colored coat contains a first surface exposed to the interior of the lens-forming cavity and a second surface in contact with the molding surface; (b) curing the ink printed on the mold; (c) dispensing a silicone hydrogel lens-forming material into the lens-forming cavity of the mold; (d) curing the lens-forming material within the lens-forming cavity to form the contact lens, whereby the colored coat detaches from the molding surface and becomes integral with the body of the contact lens.

12 Claims, No Drawings

PAD TRANSFER PRINTING OF SILICONE HYDROGEL LENSES USING COLORED INK

This application claims the benefit under 35 USC §119 (e) of U.S. provisional application No. 60/558,461, filed Apr. 1, 2004, incorporated by reference in its entirety.

The present invention is related to a method for making colored contact lenses, in particular to colored silicone hydrogel contact lenses. The present invention is also related to inks for making colored silicone hydrogel contact lenses.

BACKGROUND OF THE INVENTION

Various methods have been disclosed to make printing inks suitable for printing either hydrophilic (hydrogel) contact lenses or the molds that are then used to make hydrogel contact lenses. For example, U.S. Pat. No. 4,668,240 to Loshaek discloses colored inks comprising at least one pigment, a binder polymer having the same functional groups (such as, —COOH, —OH, or —NH—R, wherein R is hydrogen or $C_1$ to $C_8$ alkyl), and an additional compound having at least two groups per molecule selected from at least one of —NCO and epoxy. Loshaek discloses that his inks are suitable for hydrophilic contact lenses produced with a lens polymer that contain one or more of the functional groups —COOH, —OH, or —NH—R, wherein R is hydrogen or $C_1$ to $C_8$ alkyl. The lens and binding polymers are then bound to each other by the reaction of the groups —COOH, —OH, or —NH—R in the lens or the binder polymer and binding polymers with the groups —NCO or epoxy in the binder polymer or the lens. Narducy, et al. discloses in U.S. Pat. No. 4,857,072 that the Loshaek inks are also suitable for hydrophilic contact lenses made of a lens polymer that is substantially devoid of the functional groups —COOH, —OH, or —NH—R, wherein R is hydrogen or $C_1$ to $C_8$ alkyl.

U.S. Pat. No. 5,272,010 to Quinn discloses an ink comprising at least one pigment, binder polymer having the same functional groups (such as, —COOH, —OH, or —NH—R, wherein R is hydrogen or $C_1$ to $C_8$ alkyl), and an adhesion promoter having at least two functional groups per molecule of the formula —$CH_2$—O—$R_1$ wherein $R_1$ is hydrogen or $C_1$ to $C_{16}$ alkyl, and said —$CH_2$—O—$R_1$ groups are attached to a carbon atom that is part of an aromatic ring, or attached to a nitrogen or oxygen atom. The Quinn ink is suitable for hydrophilic contact lenses similar to that of U.S. Pat. Nos. 4,668,240 and 4,857,072.

U.S. patent application publication No. 2003/0054109 to Quinn, et al. discloses an ink comprising at least one colorant, and a binder polymer having latent crosslinkable pendent groups (e.g., epoxy, hydroxy, alkenyl, isocyanate, peroxy, perester, anhydride, silane, and combinations thereof). Such inks are substantially free of a separate adhesion promoter species such as hexamethylene diisocyanate or hexamethoxymethylmelamine and are for hydrophilic contact lenses.

However, inks described in the prior art are for non-silicone hydrogel lenses and would be undesirable for use with silicone hydrogels. In recent years, silicone hydrogel contact lenses, for example, Focus NIGHT & DAY™ (CIBA VISION), have become more and more popular because of corneal health benefits provided by their high oxygen permeability and comfort. Inks described in the prior art may not be compatible with silicone hydrogel lenses, since they are designed for conventional (non-silicone) hydrogels and not for silicone hydrogel lenses. They may have adverse effects to the properties (e.g., oxygen permeability, ion permeability, etc.) of silicone-hydrogel lenses and may even affect lens parameters such as base curve and diameter because they are not compatible with the lens polymer.

Therefore, there are needs for a method for making colored silicone hydrogel contact lenses, and for inks suitable for printing a high-quality color image on a silicone hydrogel contact lens.

SUMMARY OF THE INVENTION

In one aspect, the present invention comprises a method for making a colored silicone hydrogel contact lens, comprising the steps of: (a) applying a color coat to at least a portion of at least one molding surface of a lens mold with an ink, wherein the ink comprises at least one colorant, a silicone-containing binder polymer, an adhesion promoter, and optionally a diluent, wherein the silicone-containing binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromer, and (iv) optionally one or more components selected from the group consisting of a polymerization initiator, a chain transfer agent, and a solvent, wherein the mold has a lens-forming cavity between the molding surfaces, wherein the colored coat contains a first surface exposed to the interior of the lens-forming cavity and a second surface in contact with the molding surface; (b) curing the ink printed on the mold; (c) dispensing a silicone hydrogel lens-forming material into the lens-forming cavity of the mold; (d) curing the lens-forming material within the lens-forming cavity to form the contact lens, whereby the colored coat detaches from the molding surface and becomes integral with the body of the contact lens.

In another aspect, the present invention provides a method for making a colored silicone hydrogel contact lens, comprising the steps of: (a) providing a contact lens constructed of a silicone hydrogel; (b) applying a color coat to at least a portion of a surface of the lens with an ink, wherein the ink comprises at least one colorant, a silicone-containing binder polymer, an adhesion promoter, one or more vinylic monomers, and optionally a diluent, wherein the silicone-containing binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromer; and (iv) optionally one or more components selected from the group consisting of a polymerization initiator, a chain transfer agent, and a solvent; and (c) curing the ink, thereby causing the color coat to adhere to the lens.

In a further aspect, the present invention provides an ink for pad transfer printing of a silicone hydrogel.

In another further aspect, the present invention provides a method for making a colored silicone hydrogel contact lens, the method comprising the steps of: (a) applying a color coat to at least a portion of at least one molding surface of a lens mold with an ink, wherein the ink comprises at least one colorant, a silicone-containing binder polymer, and optionally a diluent, wherein the silicone-containing binder polymer is a copolymerization product of a polymerizable mixture including (i) at least one hydrophilic vinylic monomer; (ii) at least one silicone-containing vinylic monomer or macromer, and (iii) optionally one or more components selected from the group consisting of a polymerization initiator, a chain transfer agent, and a solvent, wherein the mold has a lens-forming cavity between the molding surfaces, wherein the colored coat contains a first surface exposed to the interior of the lens-forming cavity and a second surface in contact with the molding surface; (b) curing the ink printed on the mold; (c) dispensing a silicone hydrogel lens-forming material into the lens-forming cavity of the mold; (d) curing the lens-forming material within the lens-forming cavity to form the contact lens, whereby the colored coat detaches from the molding surface and becomes integral with the body of the contact lens. In addition, one or more of the mold surfaces may be treated (e.g. by corona discharge) to enhance its ability to accept the ink.

In still a further aspect, the present invention provides a method for making a colored silicone hydrogel contact lens, the method comprising the steps of: (a) applying a color coat to at least a portion of at least one molding surface of a lens mold with an ink, wherein the ink comprises at least one colorant, a silicone-containing binder polymer, and optionally a diluent, wherein the silicone-containing binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromer, and (iv) optionally one or more components selected from the group consisting of a polymerization initiator, a chain transfer agent, and a solvent, wherein the mold has a lens-forming cavity between the molding surfaces, wherein the colored coat contains a first surface exposed to the interior of the lens-forming cavity and a second surface in contact with the molding surface; (b) curing the ink printed on the mold; (c) dispensing a silicone hydrogel lens-forming material into the lens-forming cavity of the mold; (d) curing the lens-forming material within the lens-forming cavity to form the contact lens, whereby the colored coat detaches from the molding surface and becomes integral with the body of the contact lens.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

The invention is generally related to a method for making a colored silicone hydrogel contact lens.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye patterns, made-to-order (MTO) patterns, and the like; an inversion mark that allows a user to handle and insert easily a contact lens; an rotation mark; toric marks (cylindrical axis, ballast axis); or contact lenses stock keeping units (SKUs), for example, either in forms of numbers or as bar codes. A color image can be a single color image or a multi-color image. A color image is preferably a digital image, but it can also be an analog image.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" is employed herein in a broad sense and is intended to encompass any groups containing at least one >C═C< group. Exemplary ethylenically unsaturated groups include without limitation acryloyl, methacryloyl, allyl, vinyl, styrenyl, or other C=C containing groups.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers.

In one aspect, the present invention comprises a method for making a colored silicone hydrogel contact lens, comprising the steps of: (a) applying a colored coat to at least a portion of at least one of molding surfaces of a lens mold with an ink, wherein the ink comprises at least one colorant, a silicone-containing binder polymer, an adhesion promoter, one or more vinylic monomers or macromers, and optionally a diluent, wherein the silicone-containing binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromer, and (iv) optionally one or more components selected from the group consisting of a polymerization initiator, a chain transfer agent, and a solvent, wherein the mold has a lens-forming cavity between the molding surfaces, wherein the colored coat contains a first surface exposed to the interior of the lens-forming cavity and a second surface in contact with the molding surface; (b) curing the ink printed on the mold; (c) dispensing a silicone hydrogel lens-forming material into the lens-forming cavity of the mold; (c) curing the lens-forming material within the lens-forming cavity to form the contact lens, whereby the colored coat detaches from the molding surface and becomes integral with the body of the contact lens.

A "colored coat" refers to a coating on an object and having a color image printed therein. A color image is what described above.

Methods of manufacturing mold sections for cast-molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold on which a colored coat can be applied thereon in accordance with the present invention.

In general, a mold comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

The first and second mold halves can be formed through various techniques, such as injection molding. These half sections can later be joined together such that a cavity forms therebetween. Thereafter, a contact lens can be formed within the cavity of the mold sections using various processing techniques, such as actinic or thermal curing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, and PMMA can be used. Other materials that allow UV light transmission could be used, such as quartz glass.

"Colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment be heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention.

A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allows the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridiscent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

A "colorant" can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skilled in the art will know how to select colorants.

Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

"A binder polymer" refers to a crosslinkable polymer that comprises crosslinkable groups and can be crosslinked by a crosslinker or upon initiation by a chemical or physical means (e.g., moisture, heating, UV irradiation or the like) to trap or bind colorants onto or into a contact lens such as that term is known in the art.

The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

The crosslinking may occur by other means. For example, an amino group and a hydroxyl group can covalently linked together by using a coupling agent (e.g., a carbodiimide) to form an amide bond. Examples of carbodiimides are 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

Exemplary covalent bonds or linkage, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy, olefinically unsaturated radicals.

Crosslinkable groups can also be suitable groups containing reactive H. Crosslinking could also be accomplished by a free radical species generated during the UV or thermal cure of the ink. The resultant free radicals could abstract a suitable group (such as a reactive H) on, for example, the binder polymer to form a radical which in turn reacts with another species such as another binder polymer to set up a crosslinked structure.

In accordance with the invention, a binder polymer is a silicone-containing binder polymer with crosslinkable groups. A silicone-containing binder is intended to describe a binder polymer prepared from a composition containing at least one silicone-containing monomer. It is found that a silicone-containing binder polymer is more compatible with a silicone hydrogel lens-forming material and/or a silicone hydrogel material so produced than non silicone-containing binder polymer. An ink comprising a silicone-containing binder polymer for making a silicone hydrogel colored lens may cause less internal stress within the silicone hydrogel colored lens.

In one embodiment, a silicone-containing binder polymer of the invention is a copolymerization product of a polymerizable mixture including: (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; and (iii) at least one silicone-containing vinylic monomer or macromer. one or more components selected from the group consisting of a polymerization initiator (i.e., a photoinitiator or a thermal initiator), a chain transfer agent, and a solvent. The polymerizable mixture can also include a polymerization initiator (i.e., a photoinitiator or a thermal initiator), a solvent which is preferably the solvent used in an ink, and a chain transfer agent. The polymerizable mixture can optionally include a hydrophobic vinylic monomer, for example, such as, 2-ethoxyethylmethacrylate (EOEMA).

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocur® types, and Irgacure® types, preferably Darocur® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN), 4,4-azobis-4-cyanovaleric acid (VAZO 68), or 2,2'-azobisisobutyronitrile (VAZO 64). More preferably, the thermal initiator is azobisisobutyronitrile (AIBN) or 2,2'-azobisisobutyronitrile (VAZO 64).

Examples of siloxane-containing monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any know suitable siloxane-containing macromer can be used to prepare soft contact lenses. A particularly preferred siloxane-containing macromer is selected from the group consisting of Macromer A, Macromer B, Macromer C, and Macromer D described in U.S. Pat. No. 5,760,100, herein incorporated by reference in its entirety.

Nearly any hydrophilic vinylic monomer can be used in the fluid composition of the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic vinylic monomers are N,N-dimethylacrylamide (DMA), 2-hydroxyethylmethacrylate (HEMA), hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, and methacrylic acid.

Any know suitable vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof can be used as functionalizing vinylic monomer in the present invention. Preferred examples of such vinylic monomers includes methacrylic acid (MAA), acrylic acid, glycidylmethacrylate, glycidylacrylate, HEMA, HEA, and N-hydroxymethylacrylamide (NHMA).

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of functional groups (e.g., DMA, NVP).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

A solvent can be water, an organic or inorganic solvent, a mixture of several organic solvents, or a mixture of water and one or more water soluble or water miscible organic solvents. Any known suitable solvents can be used, so long as they can dissolve the binder in the ink of the invention and aid in the stability of the colorant. Exemplary solvents include, without limitation, water, acetone, alcohols (e.g., methanol, ethanol, propanol, isopropanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

In accordance with the invention, copolymerization reaction for preparing a silicone-containing binder polymer can be initiated by heat or actinic radiation (e.g., UV) in a polymerizable mixture which includes a solvent (e.g, ethanol or cyclopentanone), a thermal initiator (e.g., AIBN) or a photoinitiator, a chain transfer agent (e.g., ethyl mercaptan (EtSH)), a hydrophilic vinylic monomer devoid of functional groups (e.g. DMA), a functionalizing vinylic monomer having at least least one functional groups (e.g. HEMA, MAA, or glycidylmethacrylate), an alkoxysilane monomer (e.g. TRIS), and monomethacrylated polydimethylsiloxane. Preferably, the polymerization reaction is not complete, thereby producing a silicone-containing binder polymer dissolved in a solvent which preferably contains some residual unreacted vinylic monomers. A person skilled in the art will know well how to control polymerization level.

In accordance with a preferred embodiment of the invention, the binder polymer is not purified from the resultant solution after partial polymerization of the polymerizable mixture. The resultant solution containing the silicone-containing binder polymer and residual vinylic monomers are used directly for preparation of an ink of the invention.

In another embodiment of the invention, a silicone-containing binder polymer is a polyurethane and/or polyurea polymer having at least two functional groups which can be hydroxyl, amino (primary or secondary), isocyanato groups. A polyurethane/polyurea binder polymer can be prepared by reacting (polymerizing) of a mixture containing: (a) at least one aminoalkyl polyalkyleneglycol (a poly(oxyalkylene)diamine) or one polyalkyleneglycol (poly(alkylene oxide)) or one $\alpha,\omega$-dihydroxyl alkyl end-capped polysiloxane (b) optionally at least one compound having at least two hydroxy or amino (primary or secondary) groups, (c) at least one diisocyanate, and (d) optionally a polyisocyanate.

Di-hydroxy-capped polysiloxanes can be synthesized according to any known process, for example, by reacting a disiloxane or dimethoxydimethylsilane or diethoxy dimethyl silane with cyclopolydimethyl siloxane under acidic conditions. Examples of aminoalkyl polyalkyleneglycol are so-called Jeffamines® compounds. Exemplary poly(alkylene glycol)s include, but are not limited to a poly(ethylene glycol), a poly(propylene glycol), a poly(ethylene glycol)/poly (propylene glycol) block polymer, a poly(ethylene glycol)/poly(propylene glycol)/poly(butylene glycol) block polymer, a polytetrahydrofuran, a poloxamer, and mixtures thereof.

An "adhesion promoter" refers to a compound (or crosslinker) comprising two or more functional groups. A crosslinker molecule can be used to crosslink two or more monomers or polymer molecules. Many different crosslinking reactions could be used to cause chemical bonding between different binder polymer molecules to entrap the pigmented particles. Most crosslinkers are identified by bi- or multi-functional reactive groups. For example, diphenolic, diepoxide, dimelamine, diisocyanate, or dialdehyde resins could be used. Multi-functional phenolics have structures as follows: $(HOH_2CPh)_n$-$R_9$, where Ph is a phenol group. Multi-functional epoxides have structures as follows: $(CH_2OCH)_n$—$R_9$. Multi-functional aldehydes have the following structure: $(HCO)_n$—$R_9$ or $(CH_3CO)_n$—$R_9$. Multi-functional isocyanates have the following structure: $(OCN)_n$—$R_9$. Melamine resins have the following structure: $(HOH_2C$-Mel$)_n$-$R_9$, where Mel is

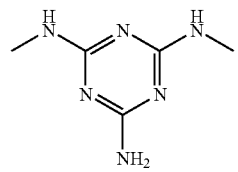

For the above examples, $R_9$ may be a aliphatic, alicyclic, aliphatic-alicyclic, aromatic, aliphatic-aromatic hydrocarbon, vinyl alcohol, vinyl butyral, or vinyl acetate, and n is a number greater than 1. Mixed functional groups could be used (i.e. an epoxide with an isocyanate).

Exemplary isocyanate compounds include hexamethylene diisocyanate (HMDI), 2,4-toluene diisocyanate and bis(isocyanato pheyl)methane.

Exemplary epoxide-containing groups include bisphenol, diepoxide, and epichlorhydrin.

The ink of the invention comprises preferably one or more vinylic monomers or macromers, more preferably at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof, even more preferably a mixture of a functionalizing vinylic monomer, a hydrophilic vinylic monomer, and optionally a silicone-containing vinylic monomer or macromer (e.g., HEMA, DMA, and TRIS (or monomethacryloxypropyl-terminated polydimethylsiloxane)) in order to enhance its compatibility with silicone hydrogels. In particular, vinylic monomers for making a silicone hydrogel contact lens to be printed are added in the ink of the invention.

The ink of the invention can also include a thermal initiator or a photoinitiator. Any suitable photoinitiators can be used in the ink formulations. Examples of photoinitiators include but are not limited to Irgacure 2959, Irgacure 907, Irgacure 500, Irgacure 651, Irgacure 369, Darocur 1173, and Darocur 4265. In addtion, combinations of initiators can be used.

In accordance with the invention, a diluent can be a solvent or a solution of one or more vinylic monomers.

The ink of the invention can further comprise one or more components selected from the group consisting of surfactant, humectant, antimicrobial agents, antioxidant agents, anti-coagulating agents, and other additives known in the art.

The ink of the invention can be used to produce an opaque, translucent, or transparent color image.

In accordance with the invention, a colored coat (with a color image) can be applied on the molding surface of one or both mold portions by using any known printing technique, such as, for example, pad transfer printing (or pad printing), or inkjet printing. A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

Pad transfer printing is well known in the art (see, For example, U.S. Pat. No. 3,536,386 to Spivack; U.S. Pat. No. 4,582,402 and U.S. Pat. No. 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad or pad made of another suitable material can be used in the present invention. Silicone pads are commercially available. However, different pads could give different print qualities. A person skilled in the art will know how to select a pad for a given ink.

Clichés can be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliché according to any methods known to a person skilled in the art, for example, by chemical etching or laser ablation or the like. It is also desirable to clean clichés after use using standard cleaning techniques known to a person skilled in the art, such as, for example, immersion in a solvent, sonication, or mechanical abrasion.

Printing of contact lenses or molds for making contact lenses using an inkjet printing process is described in published U.S. patent application Ser. Nos. 2001/0050753, 2001/0085934, 2003/0119943, and 2003/0184710, herein incorporated by references in their entireties.

After printing an ink of the invention on a molding surface of a mold, the printed ink can be cured by a chemical or physical means (e.g., moisture, heating, actinic irradiation or the like) in accordance with the invention. It is desirable that the printed ink is cured to an extent to minimize loss of pattern definition of the colored coat resulted from subsequent filling of a lens-forming material. It should understood that an ink of the invention should have a good transferability of the colored coat from a mold to a contact lens and a good adhesion to the molded lens.

A "good transferability from a mold to a contact lens" in reference to an ink or a colored coat means that a color image printed on a molding surface of a mold with the ink can be transferred completely onto a contact lens cured in that mold.

A "good adhesion to a contact lens or a silicon hydrogel contact lens" in reference to a colored coat or an ink means that the colored coat (with a color image) generated on the lens with the ink can pass at least a finger rubbing test, preferably pass the finger rubbing test and a sonication-in-alcohol surviving test.

The finger rubbing test is performed by removing the hydrated contact lens from a packaging solution, e.g., saline, and digitally rubbing the lens between either two fingers or a finger and a palm for up to about 10 seconds. Visible and microscopic (~10x) observation of colorant bleeding, smearing, or delamination indicates failure of the rub test.

The sonication-in-alcohol test is performed as follows. A colored contact lens is immersed in 5 ml of alcohol, sonicated for about 1 minute and then placed in a vial containing borate buffered saline (BBS). After about 10 seconds, the saline is drained and about 5 ml of fresh BBS is added. After equilibrating for about 5 minutes in the BBS, the lens is inspected for signs of adhesion failure (e.g., colorant bleeding, smearing, or delamination).

The good transferability and adhesion may be achieved by crosslinking of the binder polymer to the lens polymer and/or by interpenetrating network formation, during curing of the lens-forming material in the mold. Interpenetrating networks are also formed when the binder polymer is crosslinked to the lens polymer.

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

Preferably, curing of the ink printed on the mold does not consume all of ethylenically unsaturated groups in the ink. Unreacted ethylenically unsaturated or other crosslinkable groups in the ink can copolymerize with vinylic monomers and/or macromers of the lens forming material when curing the lens forming material in the mold.

Without limiting this invention to any particular mechanism or theory, it is believed that the ink binders of the invention can form interpenetrating networks (IPN's) with the lens material of a silicone hydrogel lens. Adhesion of an ink of the invention to the lens by IPN formation does not require the presence of reactive functional groups in the lens polymer. A color image can be printed first with an ink of the invention on a mold for making a contact lens and the printed ink is cured. Then, a lens-forming material is dispensed in the mold. The lens-forming material is allowed to pentrate into the cured ink and then be cured to form a colored contact lens onto which the color image is transferred from the mold. The lens material (polymer or polymers) of the colored contact lens is crosslinked in the presence of a polymer (i.e., crosslinked binder polymer in the ink).

In one embodiment, a transferable clear coating can be applied to a molding surface of a mold before applying the ink by pad transfer printing. A transfer clear coating is intended to describe a coating which can be detached from a molding surface of a mold and become integral with the body of a contact lens molded in the mold. A transferable clear coating can be applied to a molding surface of mold by any suitable techniques, such as, for example, spraying, printing, swabbing, or dipping. A transferable clear coating can be prepared from a solution comprising polymerizable components and free of any colorants. For example, a transferable clear coating with substantially uniform thickness (less than 200 microns) can be prepared by spraying a molding surface with a solution having the composition (without colorant) of an ink to be used or a solution of prepolymer or a lens-forming material to be used. This transferable coating can optionally be dried or cured to form a transferable clear film (without any pigment but optionally with dyes including reactive dyes). One or more colored patterns can then be printed on this transferable clear coating or film. By applying a transferable clear coating before printing, one can make a colored lens in which printed colored patterns are imbedded just below a film derived from the transferable clear coating. Such lens may be more comfortable for wearing and have much less susceptibility to colorant leaching out of the colored lens.

Alternatively, a color image can be printed directly with an ink of the invention on a preformed silicone hydrogel contact lens to produce a colored contact lens. The printed ink is allowed to penetrate at least partially into the lens material of a contact lens and then cured (cross-linked). The curing can be activated by UV radiation or heat. The binder polymer in the ink is crosslinked in the presence of the lens material of the silicone hydrogel to form IPNs.

A "lens-forming material" refers to a polymerizable composition which can be cured (i.e., polymerized and/or crosslinked) thermally or actinically to obtain a crosslinked polymer. Lens-forming materials are well known to a person skilled in the art. In accordance with the invention, a lens-forming material comprises at least one silicon-containing vinylic monomer or macromer.

A colored silicone hydrogel contact lens can also be produced by printing a high-quality color image directly on a contact lens using an ink of the invention. A contact lens can be clear before it is printed upon. Alternatively, a contact lens can be tinted prior to being printed upon. That is, a colorant may have been added to that lens using methods that are well known in the art before that lens is printed upon using a printing method of the invention.

In another aspect, the present invention provides a method for making a colored silicone hydrogel contact lens, comprising the steps of: (a) providing a contact lens constructed of a silicone hydrogel; (b) applying a color coat to at least a portion of a surface of the lens with an ink, wherein the ink comprises at least one colorant, a silicone-containing binder polymer, an adhesion promoter, one or more vinylic monomers, and optionally a diluent, wherein the silicone-containing binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromer; and (iv) optionally one or more components selected from the group consisting of a polymerization initiator, a chain transfer agent, and a solvent; and (c) curing the ink, thereby causing the color coat to adhere to the lens.

Factors which might influence print quality and adhesion of ink to lenses include but are not limited to molecular weight, molecular weight distribution, composition of the binder polymer, lens composition, solvent type and content in both the lens and the ink. Solvents that swell the lens material are expected to enhance penetration of the binder polymer into the lens. Furthermore, the quantity and particle size characteristics of pigment in inks can also affect print quality and adhesion.

In a preferred embodiment, a method of the invention further comprises a step of applying a clear coating covering at least the colored portion of the surface of the lens. A clear coating can be formed on the colored central zone or whole lens surface by applying a layer of a clear polymerizable solution free of any colorant onto the lens surface with color prints and then polymerizing the layer of clear polymerizable solution. A clear coat may minimize leaching of a colorant and may enhance wearer's comfort.

In a further aspect, the present invention provides an ink for pad transfer printing of a silicone hydrogel. The ink of the present invention also has a good adhesion to a contact lens, preferably to a silicone hydrogel contact lens. The ink of the invention comprises at least one colorant, a silicone-containing binder polymer, an adhesion promoter, and optionally a diluent, wherein the silicone-containing binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromer, and (iv) optionally one or more components selected from the group consisting of a polymerization initiator, a chain transfer agent, and a solvent.

In a preferred embodiment of the invention, an ink of the invention comprises: a solvent in an amount of from about 25% to 99% by weight, preferably from about 40% to 75% by weight, more preferably from about 50% and 60% by weight; a photocurable or thermocurable binder polymer in an amount of from about 1% to about 50% by weight, preferably from about 10% to about 40% by weight, more preferably from about 20% to about 35% by weight; a colorant in an amount of from about 0 to about 40% by weight, preferably from about 2% to about 25% by weight, more preferably from about 4% to 15% by weight; and a polymerization initiator in an amount of from about 0 to about 15% by weight; preferably from about 0.5% to about 10% by weight, more preferably from about 2% to 7% by weight.

This invention has utility for production of colored silicone hydrogel contact lenses. Such lenses can be extended-wear contact lenses, daily-wear contact lenses, and/or ocular prosthetic devices.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

Example 1

Synthesis of Silicone-Containing Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colourless and clear. It can be stored in air at room temperature for several months in the absence of light without any change in molecular weight.

Example 2

Synthesis of a Silicone-Containing Binder Polymer

A binder polymer is prepared in a single batch as follows. A mixture of components listed in Table 1 is reacted at 40° C. under nitrogen flow.

TABLE 1

| Binder No. | HEMA | TRIS | DMA | V68 | EtSH | Acetone | Ethanol |
|---|---|---|---|---|---|---|---|
| 1 | 0 | 35.58 | 8.90 | 0.20 | 0.32 | 0 | 55.00 |
| 2 | 0 | 8.90 | 35.58 | 0.20 | 0.32 | 0 | 55.00 |
| 3 | 19.41 | 19.41 | 20.00 | 0.26 | 0.42 | 0 | 40.50 |
| 4 | 18.17 | 18.17 | 18.17 | 0.25 | 0.24 | 45.00 | 0 |
| 5 | 14.94 | 13.94 | 20.92 | 0.20 | 0 | 0 | 50.00 |
| 6 | 17.43 | 12.95 | 19.42 | 0.20 | 0 | 0 | 50.00 |
| 7 | 19.92 | 11.95 | 17.93 | 0.20 | 0 | 0 | 50.00 |
| 8 | 22.41 | 10.92 | 16.47 | 0.20 | 0 | 0 | 50.00 |
| 9 | 17.43 | 12.95 | 19.42 | 0.20 | 0 | 0 | 50.00 |
| 10 | 14.68 | 14.68 | 15.12 | 0.20 | 0.32 | 0 | 55.00 |
| 11 | 20.76 | 15.42 | 23.13 | 0.20 | 0.48 | 0 | 40.00 |

TRIS = tristrimethylsilyloxysilylpropyl methacrylate;
V68 = 4,4-azobis-4-cyanovaleric acid;
EtSH = ethyl mercaptan Ink Preparation Inks are prepared by mixing a binder polymer solution obtained above without separation and purification of the synthesized binder polymer with other components according the formulation shown in Table 2.

TABLE 2

| Ink No. | Binder No. | Diluent | HDI | Pigment |
|---|---|---|---|---|
| 1 | 4 | HEMA | Yes | 1.74% PCN blue |
| 2 | 2 | Acetone | 0 | 2.60% PCN blue |
| 3 | 1 | Ethanol | 0 | 2.91% PCN blue |
| 4 | 3 | Ethanol | Yes | 4.02% Micro Bronze |
| 5 | 5 | Ethanol | Yes | 5.25% Micro Bronze |
| 6 | 6 | Ethanol | Yes | 4.44% Micro Bronze |
| 7 | 7 | Ethanol | 0 | 5.00% Micro Bronze |
| 8 | 8 | Ethanol | Yes | 4.78% Micro Bronze |
| 9 | 9 | Ethanol | Yes | 4.4% PCN blue, 0.25% $TiO_2$* |
| 10 | 9 | Ethanol | Yes | 4.4% PCN blue, 0.25% $TiO_2$* |
| 11 | 9 | Lens formulation# | Yes | 2.4% PCN blue, 0.13% $TiO_2$* |
| 12 | 9 | Lens formulation# | Yes | 2.4% PCN blue, 0.13% $TiO_2$* |
| 13 | 10 | none | 0 | 9.79% Micro Russet |
| 14 | 10 | Ethanol | 0 | 1.8% PCN blue, 0.10% $TiO_2$* |
| 15 | 11 | Lens formulation# | Yes | 8.91% Micro Russet |
| 16 | 11 | Lens formulation# | Yes | 8.91% Micro Russet |

*Ground PCN blue;
Lens forming material prepared in this example.

Ink formulations where HDI is used, it is added at a level of ca. 4%. Binder and diluent are added in a ratio (binder:diluent) in the range of 1.6:1 to 3.4:1, with the value adjusted to give the viscosity and color intensity needed for a good transfer of the print pattern to the lens.

Micro Bronze and Micro Russet pigments are obtained from Englehard Corporation of Iselin, N.J. PCN blue and $TiO_2$ are supplied by Sun Chemical, TRIS by Shin-Etsu.

Lens-Forming Material

The siloxane-containing macromer prepared in Example 1 is use in preparation of a lens-forming material, which comprises 25.92% of the siloxane-containing macromer prepared in Example 3, 19.25% of TRIS, 28.88% of DMA, 24.95% of denatured ethanol, and 1.0% of 2-hydroxy-2-methyl-1-phenyl-o-ene (Darocur 1173).

Preparation of Colored Silicone Hydrogel Lenses

Base curve portions (male mold halves) of polypropylene lens molds are pad printed with an ink listed in Table 2. In most cases, male mold halves are corona-treated. In some experiments, the ink printed on the male mold half is subjected to a thermal curing treatment (i.e., about 45 minutes at 85° C. in air). Female portions of molds are filled with about 100 microliters of the prepared lens-forming material. The mold halves are combined and closed. The molds are then placed under a UV lamp for 45 minutes and irradiated at 3.0 mW/cm$^2$. After curing, lenses are demolded and hydrated in borate buffered saline (BBS). Results are shown in Table 3.

TABLE 3

| Ink No. | Corona* | Curing# | Results |
|---|---|---|---|
| 4 | Yes | N/A | No print. Pad would not pick ink off cliché |
| 2 | Yes | No | Dispersion of ink upon contact with the lens forming material |
| 1 | Yes | No | Dispersion of ink upon contact with the lens formulation |
| 3 | Yes | Yes | Good print quality, good print transfer to lens |
| 5 | Yes | Yes | Print remains on base curve mold half |
| 6 | Yes | Yes | Print remains on base curve mold half |
| 7 | Yes | Yes | Print remains on base curve mold half |
| 8 | Yes | Yes | Print remains on base curve mold half |
| 9 | Yes | Yes | Print remains on base curve mold half |
| 9 | Yes | No | Print remains on base curve mold half |
| 9 | Yes | Yes | Poor print quality. Good print transfer to lens. |
| 9 | Yes | No | Poor print quality. Good print transfer to lens. |
| 10 | Yes | Yes | Dispersion of ink upon contact with the lens formulation |

TABLE 3-continued

| Ink No. | Corona* | Curing# | Results |
|---|---|---|---|
| 10 | Yes | Yes | Dispersion of ink upon contact with the lens formulation |
| 11 | Yes | Yes | Good print quality. Print remains on the mold half. |
| 11 | No | Yes | Good print quality. Good print transfer to lens. |

*Molds are corona-pretreated.
Ink printed on a mold is thermally cured.

Example 3

Synthesis of a Silicone-Containing Binder Polymer

A binder polymer is prepared in a single batch as follows. A mixture of 20.38% of HEMA, 14.87% of TRIS, 22.10% of DMA, 0.19% of Vazo 64, 0.33% of EtSH, 42.13% of cyclopentanone is reacted at 40° C. under nitrogen flow.

Ink Preparation

Activation formulations are prepared by mixing components listed in Table 4. Inks are prepared by mixing (1) a binder polymer solution obtained above without separation and purification of the synthesized binder polymer from other unreactive components; and (2) other components (pigment Mearlin Microrusset 9450M from Engelhard, cyclopentanone, activation formulation listed in Table 4) according the formulation shown in Table 5.

TABLE 4

| | Activation No. | | |
|---|---|---|---|
| | 1 | 2 | 3 |
| HEMA | 29.6 | 33.6 | 28.2 |
| TRIS | 22.0 | 24.8 | 21.0 |
| DMA | 33.4 | 37.8 | 31.8 |
| HDI | 15.0 | 0 | 0 |
| Darocur 1173 | 0 | 3.8 | 19.0 |

TABLE 5

| | Ink No. | | |
|---|---|---|---|
| | 17 | 18 | 19 |
| Binder polymer | 55.8 | 50.8 | 55.8 |
| Cyclopentanone | 8.4 | 9.3 | 8.4 |
| Pigment | 8.8 | 9.9 | 8.9 |
| Activation #1 | 26.8 | 0 | 0 |
| Activation #2 | 0 | 30.0 | 0 |
| Activation #3 | 0 | 0 | 26.9 |

Lens-Forming Material

The siloxane-containing macromer prepared in Example 1 is use in preparation of a lens-forming material, which comprises 25.92% of the siloxane-containing macromer prepared in Example 3, 19.25% of TRIS, 28.88% of DMA, 24.95% of denatured ethanol, and 1.0% of 2-hydroxy-2-methyl-1-phenyl-o-ene (Darocur 1173).

Preparation of Colored Silicone Hydrogel Lenses (A) Thermal Curing of Ink.

Base curve portions (male mold halves) of polypropylene lens molds are pad printed with the ink #17. A color pattern of FreshLook is printed on the male mold halves. The ink printed on the male mold halves is subjected to a thermal curing treatment (i.e., about 45 minutes at 85° C. in air). Female portions of molds are filled with about 100 microliters of the prepared lens-forming material. The mold halves are combined and closed. The printed pattern is completely retained, even after leaving the filled molds for one hour before curing. The molds are then placed under a UVA lamp for 40 minutes and irradiated at 3.0 mW/cm$^2$ from top and bottom. After curing, molds are opened and the mold halves with lenses thereon are put in 100% isopropanol for 3 hours. After this time, the lenses are detached from the mold halves and rinsed in DI water twice (30 minutes each rinse cycle). All the ink is transferred from the mold to the lens and the printed pattern definition is completely retained. The colored lenses look cosmetically acceptable. Lenses are then put in phosphate buffered saline and autoclaved at 123° C. for 20 minutes. After autoclaving, some lenses are subjected to adhesion tests (both the finger rubbing test and the sonication-in-alcohol surviving test) as described above. All tested lenses pass the adhesion tests.

(B) UV Curing of Ink.

Base curve portions (male mold halves) of polypropylene lens molds are pad printed with an ink (Ink 18 or 19 listed in Table 5). A color pattern of FreshLook is printed on the male mold halves. The printed male mold halves are put in a UV tunnel (UVA lamps at bottom and top) at the maximum intensity (about 3.0 mW/cm$^2$). Two mold halves are removed from the UV tunnel at different time and the level of curing is checked by filling with the lens forming material in the mold (i.e., Female mold halves are filled with about 100 microliters of the prepared lens-forming material and then the mold halves are combined and closed.) Loss of pattern definition is a sign of uncured ink. Printed inks (with either inks 18 or Ink 19 are washed away immediately after adding the lens-forming material.

Base curve portions (male mold halves) of polypropylene lens molds are pad printed with an ink (Ink 18 or 19 listed in Table 5). A color pattern of FreshLook is printed on the male mold halves. The ink printed on the male mold half is subjected to a UVB curing treatment (Hamamatsu lamp with 298 nm filter, 30 mm distance from the light guide to the diffuser, 11 mm from the diffuser to the top of the mold half). Two different intensities are obtained by changing the opening size of a shutter (100% opening, estimated to be about 66 mW/cm$^2$; and 12% opening, measured to be about 10 mW/cm$^2$). Various exposure times are used (see Table 6) and ink curing results are shown in Table 6.

TABLE 6

| Ink No. | Shutter Opening | Exposure Time | Curing Of Ink |
|---|---|---|---|
| 18 | 12% | 1 minute | Fail |
| | | 2 minutes | Fail |
| | | 3 minutes | Fail |
| | | 4 minutes | Fail |
| | | 5 minutes | Fail |
| | 100% | 1 minutes | Fail |
| | | 2 minutes | Fail |
| | | 5 minutes | Fail |
| | | 10 minutes | Pass |
| 19 | 12% | 1 minutes | Fail |
| | | 2 minutes | Fail |
| | | 3 minutes | Fail partially (edges) |
| | | 4 minutes | Fail patially (edges) |
| | | 5 minutes | Pass |
| | 100% | 5 minutes | Pass |
| | | 2 minutes | Pass |
| | | 45 seconds | Pass |
| | | 40 seconds | Fail partially (edges) |
| | | 30 seconds | Fail |

Only mold halves with cured ink thereon (see Table 6) are used for making colored lenses. Female portions of molds are filled with about 100 microliters of the prepared lens-forming material. The female and male mold halves are combined and closed. The molds are then placed under a UVA lamp for 40 minutes and irradiated at 3.0 mW/cm$^2$ from top and bottom. After curing, molds are opened and the mold halves with lenses thereon are put in 100% isopropanol for 3 hours. After this time, the lenses are detached from the mold halves and rinsed in DI water twice (30 minutes each rinse cycle). For both inks (Inks 18 and 19), the print is not completely transferred from the mold to the lens. The majority of the printed ink remains on the mold, especially in the center of the pattern, near the optical zone, while the edges are transferring better. After the isopropanol swell and the water rinsing steps, the lenses show a very poor print and a very poor adhesion.

It is believed that the difference in transferability between thermal and UV curings may be due to differential consumption of ethylenically unsaturated groups of the binder polymer and vinylic monomers and/or due to presence or absence of a crosslinking agent (HDI). In the case of thermal curing, the adhesion promoter (e.g., HMDI) reacts with the functional groups of the binder polymer and the vinylic monomers while consuming minimally ethylenically unsaturated groups which can further react with a lens-forming material during the curing step of the lens-forming material to form a lens, yielding a good adhesion of the colored coat to the lens as well as a good transferability of the colored coat from the mold to the lens.

Example 4

Synthesis of a Silicone-Containing Binder Polymer

A binder polymer is prepared in a single batch as follows. A mixture of 20.82% of HEMA, 15.46% of TRIS, 23.20% of DMA, 0.20% of azobisisobutyronitrile (AIBN), 0.22% of EtSH, 40.11% of ethanol is reacted at 55° C. for 7 hours under nitrogen flow, then removed from heat and stabilized with 120 ppm TEMPO (4-hydroxy-2,2,6,6,-tetramethyl-1-piperidinyloxy, free radical) (CAS#2226-96-2).

Ink Paste Preparation

A pigment dispersion is prepared by grinding pigments (3.11% by weight of Phthalocyanine blue; 18.24% by weight of titanium dioxide) with a solvent (78.65% by weight of ethanol) in a ball mill for one day.

The binder polymer solution (61.15% by weight) obtained above without separation and purification of the synthesized binder polymer from other unreactive components is added to the dispersion (38.85% by weight). They are mixed thoroughly to form the non-reactive pastes.

Ink Preparation and Printing

The ink paste is "activated", or rendered reactive by the introduction of an activation solution (28.84% HEMA, 21.71% TRIS, 32.32% DMA, 17.12% HDI, and 0.1% Vazo 64), with the activation solution comprising 21% of the resulting ink. The activation solution is added into the paste and mixed immediately prior to printing (Ink A).

A second ink (Ink B) is prepared by: first preparing a non-reactive paste by grinding, in a ball mill, a mixture of 24.4% ethyl lactate, 64.15% of a HEMA-based binder, 0.07% PCN blue, 0.73% TiO$_2$, 1.85% iron oxide red (D605), 8.77% iron oxide yellow (D641); and then by adding an activation solution (75.7% HEMA, 8.45% EOEMA, 15.42% HDI, 0.43% VAZO 64). The finished control ink contains 21.1% activation solution.

The HEMA-based binder is prepared by polymerizing of a composition comprising of 38.33% HEMA, 4.20% EOEMA (2-ethoxyethyl methacrylate), 0.32% ME (2-mercapto ethanol), 0.21% AIBN (azobis(isobutyronitrile), and 56.93% cyclopentanone, according to a procedure similar to that described in U.S. Pat. No. 4,668,240 (herein incorporated by reference in its entirety) (polymerization reaction can be stopped by adding monoethylhydroquinone). The HEMA-based binder polymer solution obtained above without separation and purification of the synthesized binder polymer from other unreactive components is added to the ink paste and mixed immediately prior to printing.

Lens-Forming Material

The siloxane-containing macromer prepared in Example 1 is use in preparation of a lens-forming material, which comprises 25.92% of the siloxane-containing macromer prepared in Example 3, 19.25% of TRIS, 28.88% of DMA, 24.95% of denatured ethanol, and 1.0% of 2-hydroxy-2-methyl-1-phenyl-o-ene (Darocur 1173).

Printing and Thermal Curing of Ink.

Base curve portions (male mold halves) of polypropylene lens molds are pad printed with an ink. The ink printed on the male mold halves is subjected to a thermal curing treatment (i.e., about 45 minutes at 85° C. in an oven). Female portions of molds are filled with the prepared lens-forming material. The mold halves are combined, closed, allowed to sit for thirty minutes to allow the lens-forming material to permeate the print, and then cured with UV light. After curing, molds are opened and the mold halves with lenses thereon are put in 100% isopropanol for 3 hours for extraction. After this time, the lenses are detached from the mold halves and rinsed in DI water twice (30 minutes each rinse cycle). Colored lenses so produced are further subjected to plasma treatment, hydration, and sterilization.

All the ink is transferred from the mold to the lens and the printed pattern definition is completely retained. Ink B is slightly migrated into the bulk material of a colored whereas ink A is substantially stayed on the base-curve side of a colored lens. The colored lenses look cosmetically acceptable. All tested lenses pass the adhesion tests (lens swollen in IPA instead of methanol) and toxicity tests.

All test colored lenses have mechanical properties, Dk, and ion permeability equivalent to control lenses without prints and made from the same lens-forming material.

The lens parameters (diameter, base curve radius, center thickness) of colored lenses printed with Ink A have the closest match to those of control lenses, whereas the lens parameters of colored lenses printed with Ink B are more than a standard deviation above those of the control lenses.

Print-induced internal stress is examined as follows. A thin strip of a colored lens with prints or a lens without prints is excised cross-sectionally and allowed to equilibrate in a saline solution. Then, the shape of a thin strip of a colored lens is compared with the shape of a thin strip of an uncolored lens (control lens). It is found that cross-sections of colored lenses printed either with Ink A or Ink B show distortions in shape, compared with the control lenses, indicating that there are some internal stresses induced by prints. However, the internal stress observed in colored lense printed with Ink B is more severe than that observed in colored lense printed with Ink A, indicating that a silicone-containing binder polymer may be more compatible with a silicone hydrogel lens-forming material and/or a silicone hydrogel material so produced than non silicone-containing binder polymer. This difference in print-induced internal stress may explain the difference in lens parameter change induced by prints.

Example 5

Synthesis of a Silicone-Containing Binder Polymer

A binder polymer is prepared in a single batch as follows. A mixture of 21.21% of HEMA, 15.75% of TRIS, 23.63% of DMA, 0.12% of azobisisobutyronitrile (AIBN), 0.22% of EtSH, 38.95% of ethanol is reacted at 53° C. for 44 hours under nitrogen flow, then removed from heat and stabilized with 120 ppm TEMPO (4-hydroxy-2,2,6,6,-tetramethyl-1-piperidinyloxy, free radical) (CAS#2226-96-2).

Hazel Ink Paste Preparation

A pigment dispersion is prepared by grinding in a ball mill a mixture of 0.07% PCN blue, 0.73% $TiO_2$, 1.85% iron oxide red (D605), 8.77% iron oxide yellow (D641), 24.4% ethanol, and 64.15% of the silicone-containing binder polymer prepared above (without separation and purification of the synthesized binder polymer from other unreactive components).

Green Ink Paste Preparation

A pigment dispersion is prepared by grinding in a ball mill a mixture of 0.03% PCN blue, 8.08% $Cr_2O_3$ (E240), 28.5% ethanol, and 63.36% of the silicone-containing binder polymer prepared above (without separation and purification of the synthesized binder polymer from other unreactive Activation Solution An activation solution is prepared to contain 29.64% HEMA, 22.31% TRIS, 33.21% DMA, 14.83% HDI, and 0.1% Vazo 64.

Lens-Forming Material

The siloxane-containing macromer prepared in Example 1 is use in preparation of a lens-forming material, which comprises 25.92% of the siloxane-containing macromer prepared in Example 3, 19.25% of TRIS, 28.88% of DMA, 24.95% of denatured ethanol, and 1.0% of 2-hydroxy-2-methyl-1-phenyl-o-ene (Darocur 1173).

Preparation of Colored Silicone Hydrogel Lenses

The ink paste is "activated", or rendered reactive by the introduction of the activation solution prepared above, with the activation solution comprising 21% of the resulting ink. The activation solution is added into the paste and mixed immediately prior to printing.

Base curve portions (male mold halves) of polypropylene lens molds are pad printed with one of the above-prepared inks. The ink printed on the male mold halves is subjected to a thermal curing treatment (i.e., about 45 minutes at 90° C. in an oven). Female portions of molds are filled with the above-prepared lens-forming material and closed with corresponding male mold halves with cured prints thereon. After closing molds, the lens-forming material in each molds is cured to form a colored lens. Colored lenses so produced are further subjected to extraction, plasma treatment, hydration, and sterilization.

Various curing geometry, male or famle mold half located at the bottom of the mold for curing through top (above the mold) or from the bottom (below the mold), are used in the experiments. There is no significant difference among all curing configurations.

Two parallel experiments are carried out to examine the effect of cooling the printed mold before filing with a lens-forming material, one with mold halves with prints thereon which are are cooled for 2 hours after thermal curing of the inks and the other with mold halves with prints thereon without cooling after thermal curing of the inks. There is no noticeable difference between two experiments.

In a series of experiments, male mold halves are subjected corona treatment before printing with inks. Like all other experiments with male mold halves without pre-corona-treatment, all the inks are transferred from the mold to the lens and the printed pattern definition is substantially or completely retained. However, with corona-pretreatment of molds, printed inks tend to substantially stay at or substantially near the base-curve surface of a colored lens so produced. Without corona-pretreatment of molds, printed inks can slightly migrated into the bulk material of a colored lens so produced. It is understood that significant migration of printed inks may affect adversely cosmetic appearance of a colored lens, especially its consistency in production. Corona pretreatment of molds before printing may reduce this migration.

All colored lenses look cosmetically acceptable. All tested lenses pass the adhesion tests (lens swollen in IPA instead of methanol).

Print-induced internal stress is examined according to the procedure described in Example 4. All of colored lenses show some print-induced internal stress. There is some improvement in reducing print-induced internal stress with the modification of the ink formulation, compared with Example 4.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for making a colored silicone hydrogel contact lens, comprising the steps of:
   (a) applying a color coat to at least a portion of at least one of the molding surfaces of a lens mold with an ink, wherein the ink comprises at least one colorant, an adhesion promoter, at least one first functionalizing vinylic monomer containing at least one functional group selected from the group consisting of hydroxyl group —OH, amino group —NHR, carboxylic group —COOH, epoxy group, amide group —CONHR, and combinations thereof, a silicone-containing binder polymer with crosslinkable groups selected from the group consisting of hydroxyl groups, amino groups —NHR in which R is hydrogen or $C_1$ to $C_8$ alkyl, carboxylic groups, epoxy groups, amide groups —CONHR, and combinations thereof, and optionally a diluent, wherein the silicone-containing binder polymer is obtained by copolymerizing a polymerizable mixture including
   (i) at least one hydrophilic vinylic monomer;
   (ii) at least one second functionalizing vinylic monomer containing at least one functional group selected from the group consisting of hydroxyl group —OH, amino group —NHR, carboxylic group —COOH, epoxy group, amide group —CONHR, and combinations thereof;
   (iii) at least one siloxane-containing vinylic monomer or macromer;
   (iv) a solvent capable of dissolving the resultant silicone-containing binder polymer; and
   (v) optionally one or more components selected from the group consisting of a polymerization initiator, and a chain transfer agent,
   wherein the lens mold includes a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces, wherein the colored coat contains a first surface exposed to the interior of the lens-forming cavity and a second surface in contact with the molding surface;
(b) partially or completely curing the ink printed on the mold to convert the colored coat to a colored film;
(c) dispensing a silicone hydrogel lens-forming material into the lens-forming cavity of the mold; and
(d) curing the lens-forming material within the lens-forming cavity to form the contact lens, whereby the colored film detaches from the molding surface and becomes integral with the body of the contact lens.

2. The method of claim 1, wherein the hydrophilic vinylic monomer is devoid of functional groups, wherein the first and the second functionalizing vinylic monomer are selected independently from the group consisting of methacrylic acid, acrylic acid, glycidylmethacrylate, glycidylacrylate, 2-hydroxyethylmethacrylate, hydroxyethyl acrylate, hydroxypropyl acrylate, hydroxypropyl methacrylate, N-hydroxymethylacrylamide, and mixtures thereof.

3. The method of claim 2, wherein the hydrophilic vinylic monomer is DMA or NVP.

4. The method of claim 3, wherein the first and the second functionalizing vinylic monomer are selected independently from the group consisting of HEMA and HEA.

5. The method of claim 2, wherein the siloxane-containing vinylic monomer or macromer is methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane, tristrimethylsilyloxysilylpropyl methacrylate, or a combination thereof.

6. The method of claim 2, wherein the polymerizable mixture comprises a solvent, a thermal initiator or a photoinitiator, and a chain transfer agent.

7. The method of claim 1, wherein the adhesion promoter is a diphenolic compound, a diepoxide compound, a dimelamine compound, a diisocyanate compound, or a dialdehyde compound, $(HOH_2CPh)_n$-$R_9$, $(CH_2OCH)_n$—$R_9$, $(HCO)_n$—$R_9$ or $(CH_3CO)_n$—$R_9$, $(OCN)_n$—$R_9$, or $(HOH_2C$-$Mel)_n$-$R_9$, where Ph is a phenol group, wherein $R_9$ is a $C_1$-$C_{35}$ aliphatic, alicyclic, aliphatic-alicyclic, aromatic, or aliphatic-aromatic radical, a vinyl alcohol radical, a vinyl butyral radical, or a vinyl acetate radical, wherein n is a number greater than 1, and wherein Mel is

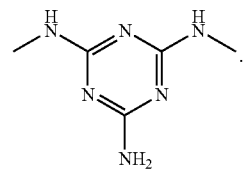

8. The method of claim 7, wherein the adhesion promoter is hexamethylene diisocyanate, 2,4-toluene diisocyanate, bis(isocyanato pheyl)methane, bisphenol, diepoxide, epichlorhydrin, or combinations thereof.

9. The method of claim 1, wherein the color coat is applied to at least a portion of the molding surface of the first mold half.

10. The method of claim 1, wherein one colored coat is applied onto at least a portion of the molding surface of each of the first and second mold halves.

11. The method of claim 10, wherein a transferable clear coating is applied onto the molding surface of the mold before the step (a).

12. The method of claim 1, wherein a transferable clear coating is applied onto the molding surface of the mold before the step (a).

* * * * *